UNITED STATES PATENT OFFICE.

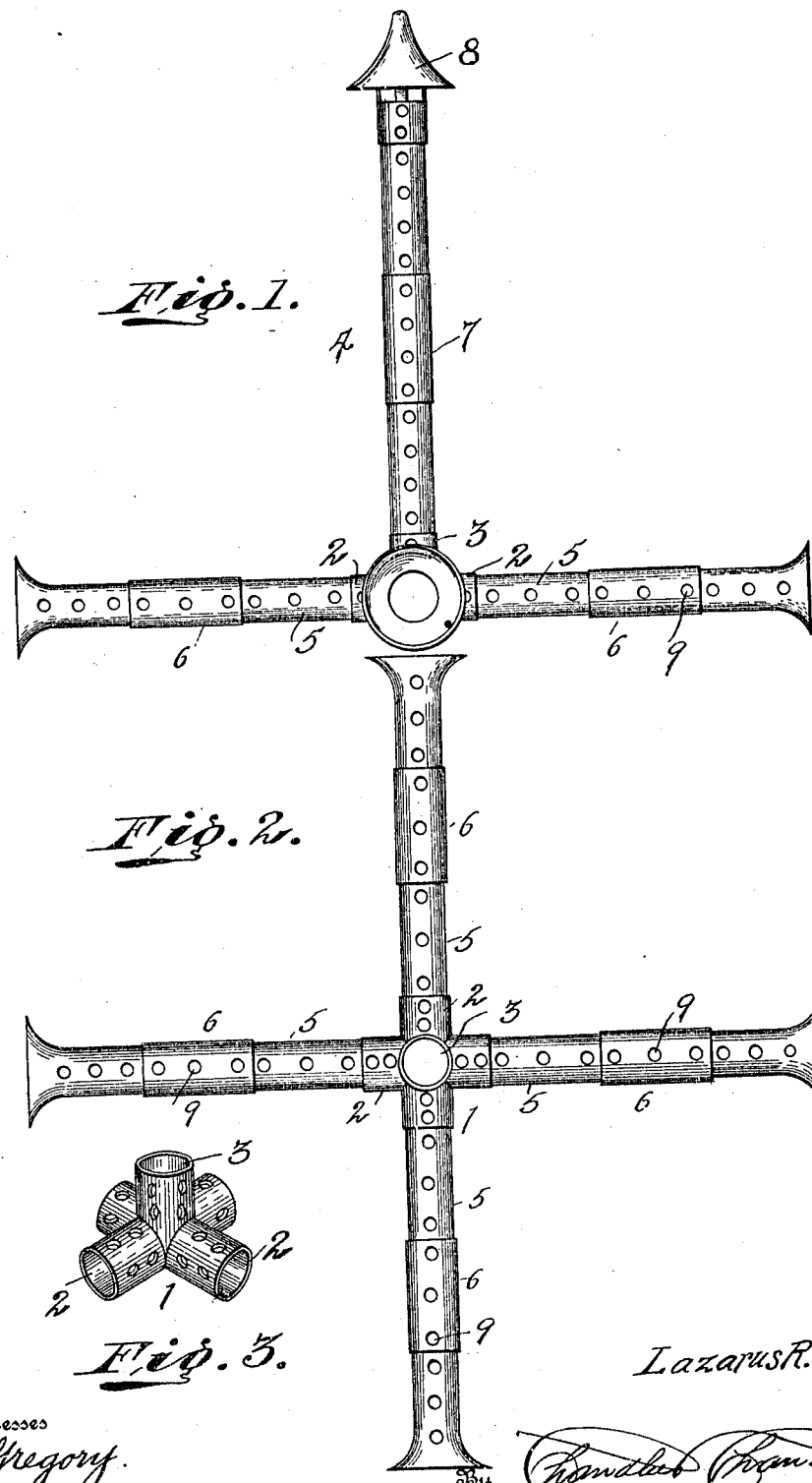

LAZARUS L. RANDLE, OF MULDON, MISSISSIPPI.

VENTILATOR.

956,999. Specification of Letters Patent. Patented May 3, 1910.

Application filed January 12, 1909. Serial No. 471,946.

*To all whom it may concern:*

Be it known that I, LAZARUS L. RANDLE, a citizen of the United States, residing at Muldon, in the county of Monroe, State of Mississippi, have invented certain new and useful Improvements in Ventilators; and I do hereby declare the following to be a full, clear, and exact description of the invention, such as will enable others skilled in the art to which it appertains to make and use the same.

This invention relates to ventilators; and has for its object to provide a simple and efficient device for ventilating stacked vegetable substances, such as hay, green cut corn, alfalfa, straw, et cetera, when damp or when not fully cured for the purpose of protecting the material from heating, molding, or rotting.

To this end, the invention consists of the construction and peculiar arrangement of certain pipes to be placed in a stack, as will be hereinafter more fully described and pointed out in the appended claim, and illustrated in the accompanying drawings, in which—

Figure 1 is an elevation of the ventilating device; Fig. 2, a plan view of the same with the ventilating cap removed; Fig. 3, a perspective view, illustrating a detailed construction.

Similar reference characters indicate the same parts throughout the figures.

In the drawings, 1 indicates a pipe union having in this instance four projecting arms 2 radiating from the center of said union in a horizontal plane, said arms being disposed at right angles to each other. From the top of the union there projects vertically another arm 3, to which a vertical trunk pipe 4 is separably connected. Air inlet pipes 5 are connected to the radiating arms 2 of the union forming a cruciform base which supports the device. Each of these pipes is made of a plurality of separable sections 6 connected together preferably by slip joints similar to stove pipe connections, so that they may be easily connected or disconnected when the ventilator is erected or taken apart. Said sections are provided each with a number of perforations through which air may enter from the material piled thereon and pass along the horizontal pipes to the union and thence up the vertical trunk 4 to the top where it escapes. The outer ends of each horizontal pipe are enlarged or made trumpet shape to give ready access to air for the purpose of creating a draft through the ventilator. The several parts of the device are preferably formed of sheet metal, such as galvanized iron, as this material is cheap, strong and will readily withstand the effects of moisture without deterioration. The union 1 may also be perforated in a manner similar to the pipe sections as represented in Fig. 3.

One method of erecting the ventilator is as follows: The union 1 is first placed on the ground or upon a sufficient quantity of hay or other material to be stacked, to raise the outer bell-mouthed ends above the ground. The pipes 5 are then connected together, as many sections being used as desired or required by the diameter or other measurement of the stack or rick, it being preferred to have the open mouths of these pipes very near, if not actually projecting beyond the outside of the stack. The pipes after being made the proper length are then slipped over or into the arms 2 of the union 1, until they fit tightly. The trunk pipe 4 is assembled by joining the separable sections 7 which are preferably larger than the section 6, until it has reached a suitable height. Instead of completing the pipe and then connecting it to the union, it may be built up a section at a time as the material is piled and when raised as high as necessary, the upper end is provided with a ventilating cap 8 of any approved construction. From this, it will be seen that the ventilator 4 is situated in the center of the stack or rick and should there be any heating of the hay or other material, of which said stack is formed, air in the trunk 4 will be heated and rise therein, escaping from the top, thereby causing cold air to enter the horizontal pipes 5 through their ends and through the perforations 9 in the pipe sections and also through similar perforations in the trunk pipe 4, air being drawn through the stacked material to enter said perforations, thereby drawing it and at the same time reducing its temperature. Although the stack may not be heated, there will be a normal circulation of air through the pipes and the stack.

The device is simple, easily taken apart for the purpose of storage, and as easily assembled when it is to be erected.

What is claimed is:

A ventilator of the class described comprising a central hollow pipe union having radially projecting tubular branches disposed in the same plane and a vertical tubular branch at right angles thereto, perforated hollow tubes connected to said radial branches, each tube being formed of a plurality of separable sections, the said tubes being formed with outer open flared ends, a hollow perforated tube connected to the vertical branch and being formed of a plurality of separable sections, and a conical-shaped hood mounted at the uppermost free end of the last named tube.

In testimony whereof, I affix my signature, in presence of two witnesses.

LAZARUS ×(his mark) L. RANDLE.

Witnesses:
 JNO. C. WICKS,
 H. J. BROWN.